No. 805,589. PATENTED NOV. 28, 1905.
E. G. STEVENS.
REIN HOLDER.
APPLICATION FILED DEC. 17, 1904.
2 SHEETS—SHEET 1.
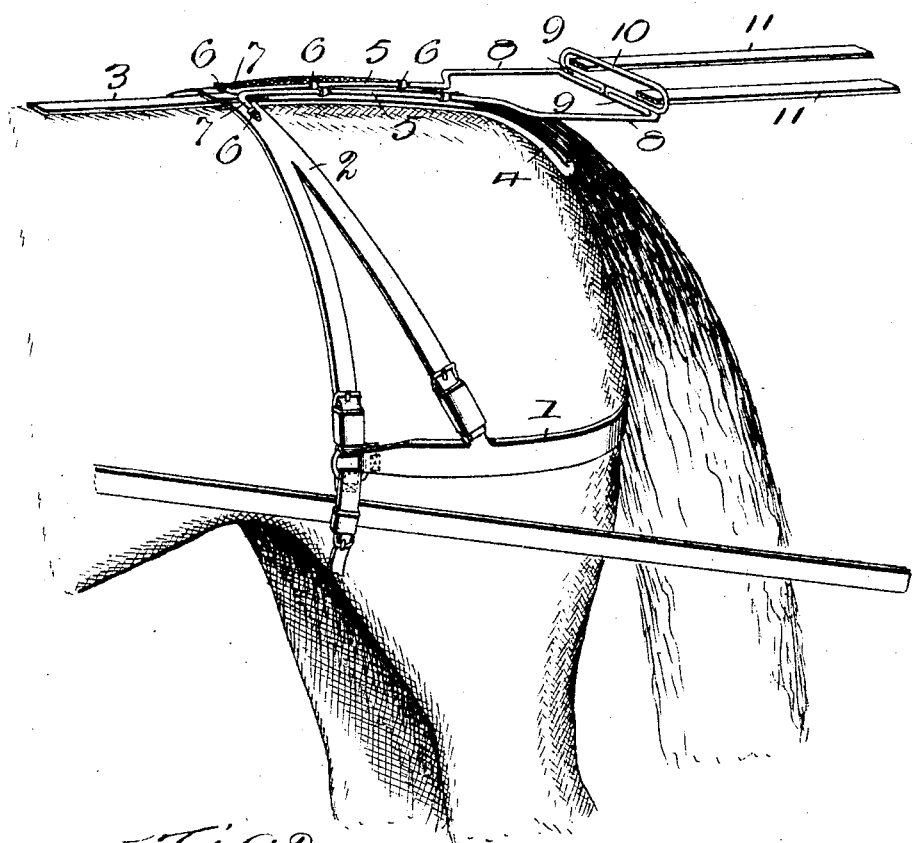
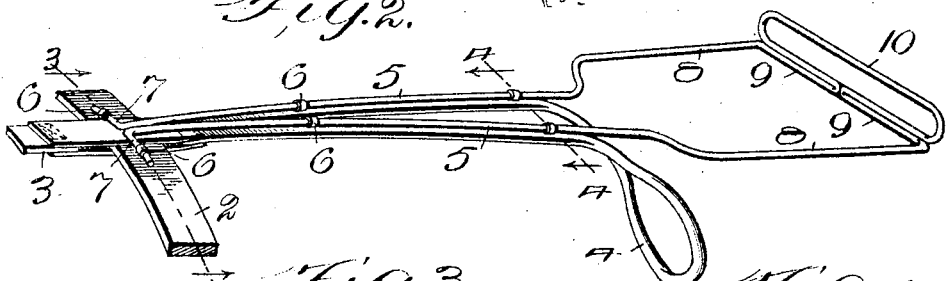
Witnesses
Inventor
E. G. Stevens.
By his Attorneys No. 805,589. PATENTED NOV. 28, 1905.
E. G. STEVENS.
REIN HOLDER.
APPLICATION FILED DEC. 17, 1904.
2 SHEETS—SHEET 2.
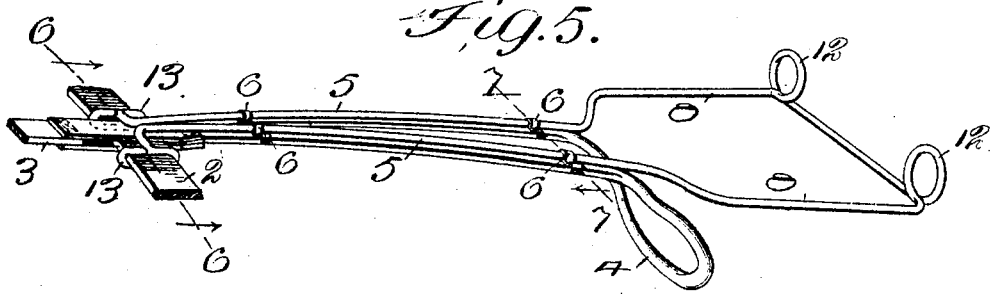
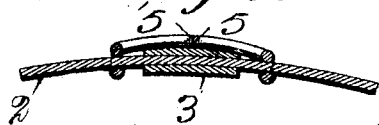
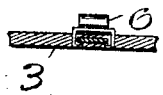
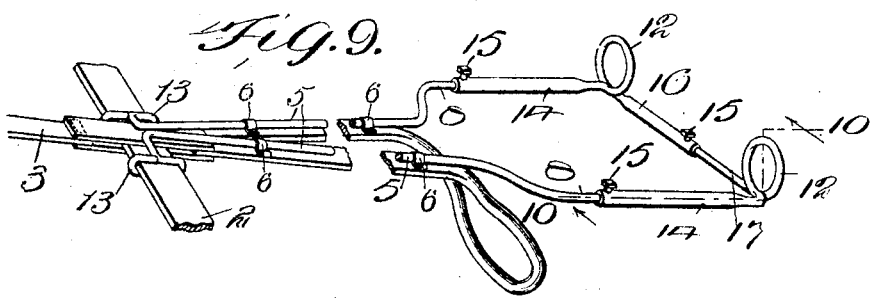
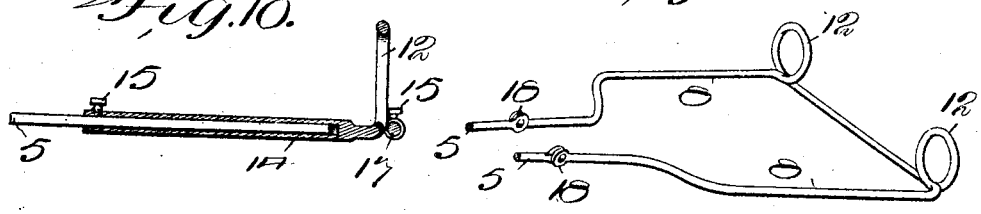
Inventor
E. G. Stevens
Witnesses

UNITED STATES PATENT OFFICE.

EDWARD G. STEVENS, OF CRANESVILLE, PENNSYLVANIA.

REIN-HOLDER.

No. 805,589.	Specification of Letters Patent.	Patented Nov. 28, 1905.

Application filed December 17, 1904. Serial No. 237,321.

*To all whom it may concern:*

Be it known that I, EDWARD G. STEVENS, a citizen of the United States, residing at Cranesville, in the county of Erie and State of Pennsylvania, have invented certain new and useful Improvements in Rein-Holders; and I do hereby declare the following to be a full, clear, and exact description of the invention, such as will enable others skilled in the art to which it appertains to make and use the same.

My invention relates to harness attachments, and more particularly to a rein-holder; and it consists of certain novel features of combination and construction of parts, the preferred form whereof will be hereinafter clearly set forth, and pointed out in the claims.

The main object of my invention, among others, is to provide a harness attachment which will prevent the reins from being engaged by the horse's tail, thereby holding the rein safely out of reach of the animal and preventing serious accidents, many of which are traced to this source.

Other objects and advantages will be hereinafter made clearly apparent, reference being had to the accompanying drawings, which are considered a part of this application, and in which—

Figure 1 shows a perspective view of my invention complete applied to use. Fig. 2 is a similar view showing my attachment on a slightly-enlarged scale. Fig. 3 is a sectional view of Fig. 2 on line 3 3 thereof. Fig. 4 is a sectional view of Fig. 2 on line 4 4 of said view. Fig. 5 is a perspective detail view showing a slightly-modified construction of my invention. Fig. 6 is a sectional view of Fig. 5 on line 6 6 thereof. Fig. 7 is a sectional view of Fig. 5 on line 7 7. Fig. 8 is a sectional view of Fig. 7, as indicated by dotted lines 8 8. Fig. 9 is a perspective detail view showing a further modification which may be adopted in the construction. Fig. 10 is a sectional view, as taken on line 10 10 of Fig. 7. Fig. 11 shows a further modification which may be adopted in carrying out my invention.

For convenience of description the various details of my invention and coöperating accessories will be designated by numerals, the same numeral applying to a similar part throughout the several views.

Referring to the numerals on the drawings, 1 designates the breeching of the harness supported in the usual way, as by the straps 2, extending from the crupper-band 3, the crupper proper, 4, extending rearwardly in the usual way, whereby the anchoring branches 5 of my rein-holder may be secured to the crupper-straps in any suitable manner, as by the staples or loops 6 or equivalent thereof.

The forward ends of the anchoring branches are bent at right angles, as indicated by the numeral 7, and also secured by suitable rivets or loops 6. The rear ends of the branches 5 are preferably bent slightly outward to form the extensions or members 8, and the ends thereof may then be bent inward and back upon themselves, as designated by the numeral 9, and finally arranged to form the loop 10, through which the driving-reins 11 may be extended and by means of which said reins are prevented from being drawn to one side.

The inwardly-extended loops 9 prevent the reins from dropping downward in the reach of the animal's tail, as will be clearly obvious.

The foregoing describes the simplest form of construction which may be adopted, inasmuch as all of the members 5, 8, 9, and 10 are readily fashioned from a single piece of suitable material, as a stiff wire of proper size.

In Fig. 5 I have illustrated how the rear ends of the branches 8 may be fashioned into loops 12, through which one of the reins may be extended, there being one loop for each rein. By reference to Fig. 5 it will also be seen that the forward ends of the branches 5 are fashioned into the encircling loops 13, whereby a contiguous part of the strap 2 may be engaged thereby, thus securely holding my rein-securing device in place.

In some instances it may be found desirable to connect the branches 5 with the rein-holding loops 12 by means of suitable sockets 14, it being obvious that suitable securing devices, as set-screws 15, must be provided. In like manner a socket 16 may be formed to coöperate with the stem 17 of one of the loops 12 and said stem held in said socket by the set-screw 15 or the equivalent thereof. If flexibility of my rein-holder attachment is desired, as when drawing upward upon the lines from a point upon a high seat of the vehicle, I prefer to provide the pivotal joints 18, as clearly shown in Fig. 11, whereby the branches 5 are rendered flexible, as will be obviously clear.

It will thus be seen that I have provided a very simple, though reliably efficient, form of attachment for harness of the character specified, making it practically impossible for the animal to engage the reins, inasmuch as the latter are at all times held securely out of the way.

The various parts of my invention may be cheaply and expeditiously manufactured and each assembled in its respective operative position, and while I have described the preferred combination and construction of elements I desire to comprehend in this application all substantial equivalents and substitutes.

Having thus fully described my invention, what I claim as new, and desire to secure by Letters Patent, is—

1. A rein-holding attachment for harness consisting of anchoring-stems, means for securing them longitudinally upon a portion of the harness, and a rearward extension movably connected to one end of the anchoring-stems, said extension having integral rein-receiving portions.

2. A rein-holding attachment for harness consisting of elongated anchoring-stems, having oppositely-projecting extensions at one end thereof, parallel integral securing-loops at the ends of the extensions, and a rearward extension movably connected to the other end of the stems, and having a rein-receiving portion.

3. A rein-holding attachment for harness consisting of elongated anchoring-stems, means for securing said stems at points between their ends, oppositely-projecting extensions at one end of the stems and substantially at right angles thereto, parallel strap-receiving loops integral with said extensions and at right angles thereto, a rearward extension to the stems, and means integral with said extension for surrounding reins.

4. A rein-holding attachment for harness consisting of anchoring-stems, means for securing the stems to the harness, and a laterally-adjustable rearward extension mounted upon and adjustably secured to the stems, said extension having a rein-holding portion.

5. A rein-holding attachment for harness consisting of anchoring-stems, means for securing them to the harness, and a longitudinally and laterally adjustable rein-holding extension connected to the stems.

In testimony whereof I have signed my name to this specification in the presence of two subscribing witnesses.

EDWARD G. STEVENS.

Witnesses:
CHAS. H. WIMERSBERGER,
FRANK WIMERSBERGER.